United States Patent
Marin et al.

(10) Patent No.: US 10,200,191 B2
(45) Date of Patent: Feb. 5, 2019

(54) ELECTRONIC CALCULATING DEVICE FOR PERFORMING OBFUSCATED ARITHMETIC

(71) Applicant: KONINKLIJKE PHILIPS N.V., Eindhoven (NL)

(72) Inventors: Leandro Marin, Eindhoven (NL); Alphons Antonius Maria Lambertus Bruekers, Nederweert (NL); Paulus Mathias Hubertus Mechtildis Antonius Gorissen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 45 days.

(21) Appl. No.: 15/527,730
(22) PCT Filed: Nov. 25, 2015
(86) PCT No.: PCT/EP2015/077577
§ 371 (c)(1),
(2) Date: May 18, 2017
(87) PCT Pub. No.: WO2016/083424
PCT Pub. Date: Jun. 2, 2016

(65) Prior Publication Data
US 2017/0324544 A1    Nov. 9, 2017

(30) Foreign Application Priority Data
Nov. 27, 2014    (EP) .................................... 14195053

(51) Int. Cl.
G06F 11/30 (2006.01)
H04L 9/00 (2006.01)

(52) U.S. Cl.
CPC .............. *H04L 9/002* (2013.01); *H04L 9/008* (2013.01); *H04L 2209/16* (2013.01)

(58) Field of Classification Search
CPC ...... H04L 2209/16; H04L 9/002; H04L 9/008
(Continued)

(56) References Cited

U.S. PATENT DOCUMENTS 5,270,956 A * 12/1993 Oruc .................... G06F 7/72
                                                       380/28
6,760,742 B1 * 7/2004 Hoyle ................. G06F 7/724
                                                       708/492
(Continued)

FOREIGN PATENT DOCUMENTS

JP    2011513787 A    4/2011
JP    2012129993 A    7/2012
(Continued)

OTHER PUBLICATIONS

Aspire Advanced Software Protection: Integration, Research and Exploitation; "Early White-Box Cryptography and Data Obfuscation Report"; Project No. 609734, Oct. 2014, 64 Page Document.
(Continued)

*Primary Examiner* — Samson B Lemma (57) ABSTRACT

An electronic calculating device (100) for performing obfuscated arithmetic in a commutative ring ($Z_n$; $Z_n[x]/f(x)$) is presented. The calculating device comprising a storage (110) arranged to store an increment table (T) defined for an increment ring element (1; $u^r$), the increment table mapping an input ring element ($k=u^{k_1}-u^{k_2}$) to an output integer-list ($T((k_1,k_2))=(l_1,l_2)$) encoding an output ring element ($l=u^{l_1}-u^{l_2}$), such that the output ring element equals the increment ring element ring-added to the input ring element ($l=k+1$). Using the increment table, a ring addition unit (130) adds a first addition-input integer-list (($a_1$, $a_2$)) encoding a first addition-input ring element and a second addition-input integer list (($b_1$, $b_2$)) encoding a second addition-input ring element. The device may comprise a ring multiplication unit (140) also using the increment table.

17 Claims, 5 Drawing Sheets

(58) Field of Classification Search
USPC .................................................. 713/189, 193
See application file for complete search history.

(56) References Cited

U.S. PATENT DOCUMENTS

| | | | |
|---|---|---|---|
| 8,595,513 B2 | 11/2013 | Adjedj | |
| 8,670,559 B2* | 3/2014 | Michiels | G06F 7/723 380/277 |
| 2008/0069345 A1* | 3/2008 | Rubin | H04L 9/0841 380/44 |
| 2012/0163584 A1* | 6/2012 | Adjedj | H04L 9/003 380/28 |

FOREIGN PATENT DOCUMENTS

| | | |
|---|---|---|
| WO | 2004112307 A2 | 12/2004 |
| WO | 2016050884 A1 | 4/2016 |

OTHER PUBLICATIONS

Chow et al: "White-Box Cryptography and an AES Implementation"; LNCS 2595, pp. 250-207, 2003.
Dardaillon et al: "Hardware Implementation of the GPS Authentication"; IEEE 2012, pp. 1-6.
Kerl: "Computation in Finite Fields"; Arizona State University and Lockheed Martin Corporation, Apr. 2004, 90 Page Document.
Wikipedia; "Lattice Multiplication" Document Downloaded From https://en.wikipedia.org/wiki/Lattice_multiplication, last updated on Apr. 24, 2017, 3 page document.
Omondi et al: "Residue Number Systems, Theory and Implemention"; Advances in Computer Science and Engineering:Tests, vol. 2, Published by Imperial College Press, 2007.

* cited by examiner

ELECTRONIC CALCULATING DEVICE FOR PERFORMING OBFUSCATED ARITHMETIC

CROSS-REFERENCE TO PRIOR APPLICATIONS

This application is the U.S. National Phase application under 35 U.S.C. § 371 of International Application No. PCT/EP2015/077577, filed on Nov. 25, 2015, which claims the benefit of European Patent Application No. 14195053.5, filed on Nov. 27, 2014 These applications are hereby incorporated by reference herein.

FIELD OF THE INVENTION

The invention relates to electronic calculating device, a ring encoding device, a ring decoding device, a table computation device, an electronic calculating method, a computer program, and a computer readable medium.

BACKGROUND

In white-box cryptography and more in general software obfuscation, computations are often performed on encoded values instead of plain values. Reverse engineering of the obfuscated software is harder if computations are performed on encoded values, instead of on the plain values themselves.

After the encoding, regular operations, like addition or multiplication, can no longer be performed using a computer's built-in primitives. The straightforward addition of encoded values does not normally result in the encoding of the addition of the values. The same holds for multiplication. In a formula: $E(x)+E(y) \neq E(x+y)$, for most x and y; E denotes the encoding function.

A solution to this problem is to introduce addition (A) and multiplication (M) tables. The tables take two encoded values as input and produce an encoded value as output that corresponds to the encoding of the addition or multiplication operation. The tables may be defined as: $A(E(x), E(y))=E(x+y)$; $M(E(x), E(y))=E(xy)$. These tables allow arithmetic to be performed directly on encoded values.

The obfuscated addition and multiplication using tables suffers from at least two drawbacks. First, the tables can become quite large. If x and y are represented as l bits, each table needs $2^{2l}$ l bits.

Second, such large tables may be easily found in software. Worse, the tables might still be identified as addition or multiplication operations even though they are encoded; for example, through properties of these functions that are preserved in the encoding. For example, the multiplication table satisfies $M(E(0), E(x))=E(0)$. An attacker may use this and similar properties to guess which operation the tables represent.

SUMMARY OF THE INVENTION

It would be advantageous to have an improved way to perform obfuscated arithmetic. A calculating device as defined in the claims is provided.

The inventors found that in some cases multiplication and addition on encoded values may be performed using a single table without having to encode multiple values into a single encoded value. Because the same table is used for addition and multiplication it would be hard to see during reverse engineering if an addition or a multiplication is performed. Because addition and multiplication appear to be the same operation when viewed from the outside, the inventors have termed this method 'homogenous obfuscation'. Even if an attacker were able to find the table that is used, and even if he were able to figure out somehow its function as an increment table, he still would not know whether addition or multiplication operations are performed. The way the table acts on elements of the integers list, will differ for addition and multiplication, however this may be easily hidden using traditional obfuscation.

In addition, the single table that is used is also smaller than the one discussed in the background: approximately $2^l$ l bits are needed. Even if only addition is used, the table needed for obfuscated addition is smaller than the table suggested in the background. The invention applies to many different commutative rings R, although not each and every ring allows encoding as integer lists. Commutative rings are a mathematical concept that includes many different familiar mathematical structures, e.g., the integers modulo a number ($\mathbb{Z}_n$) or the polynomials modulo a number and a polynomial ($\mathbb{Z}_n[x]/f(x)$). Fields are a special case of commutative rings. As will be described herein the skilled person can verify if a given ring allows the obfuscation.

For example, a ring element may be encoded as two integers (a, b). Arithmetic can be performed directly on the encoding using an increment table that maps an encoded ring element to the encoded ring element plus an increment value. For example, the table may map (a, b) to (c, d) if $u^c-u^d=u^a-u^b+1$. Both the addition and multiplication are performed by repeated applications of the increment table.

The use of an increment table to perform addition and multiplication both improves obfuscation, since the same table may be used for addition and multiplication, and reduces size, since an increment operation is unary instead of binary; that is the table may act on a single ring element, instead of two ring elements However, there is desire to further reduce the size of the increment table.

The inventors found that the increment table may be further reduced by placing restrictions on the exponents of the base element, and by implication on the integers in the integer lists, that represent ring elements. In particular, the difference between the integers in the integer list may be restricted to a particular allowed-differences list. The size of this list is smaller than the order of the base ring element, (or one of the base ring elements, if there is more than one).

As will be discussed more fully herein, there are many other possibilities and variants. It will be typically unknown to an attacker which one of many variants has been chosen in any given implementation.

The calculating device is an electronic device and may be a mobile electronic device, e.g., a mobile phone, a set-top box, a computer, a smart card, etc.

Obfuscated arithmetic as described herein may be applied in a wide range of practical applications. Such practical applications include secure applications running on private hardware, e.g., banking applications etc, wherein reverse engineering is to be prevented. Other applications include applications wherein inadvertent leaking of data is to be prevented. If a program is tricked into releasing private data this is less of a concern if the leaked data is encoded. Obfuscated arithmetic may also be applied to servers running applications. Privacy is increased if users send and receive data in encoded form.

A method according to the invention may be implemented on a computer as a computer implemented method, or in dedicated hardware, or in a combination of both. Executable code or parts thereof for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1a schematically shows an example of an embodiment of a calculating device 100, FIG. 1b schematically shows an example of an embodiment of a ring addition unit 130, FIG. 1c schematically shows an example of an embodiment of a ring multiplication unit 140, FIG. 2 schematically shows an example of an embodiment of a calculating device 101, FIG. 3 schematically shows an example of an embodiment of a table computation device 200 for computing an increment table for use in a calculating device, FIG. 4 schematically shows an example of an embodiment of a calculating method 30 for performing obfuscated arithmetic, FIG. 5 schematically shows an example of an embodiment of an addition method 400, FIG. 6 schematically shows an example of an embodiment of a multiplication method 500.

Items which have the same reference numbers in different figures, have the same structural features and the same functions, or are the same signals. Where the function and/or structure of such an item has been explained, there is no necessity for repeated explanation thereof in the detailed description.

LIST OF REFERENCE NUMERALS IN FIG. 1

100 a calculating device
110 a storage arranged to store an increment table
120 a ring negating unit
130 a ring addition unit
140 a ring multiplication unit
150 an operand store
160 a decoding unit
170 an encoding unit
172 a storage arranged to store an encoding table

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the following, for sake of understanding, elements of embodiments are described in operation. However, it will be apparent that the respective elements are arranged to perform the functions being described as performed by them.

Embodiments allow multiplication and addition operations to be performed using the same table. Below, first a number of possible architectures of embodiments of calculating devices are discussed. Next, a number of alternative ways to perform obfuscated arithmetic are discussed.

Figure 1A:
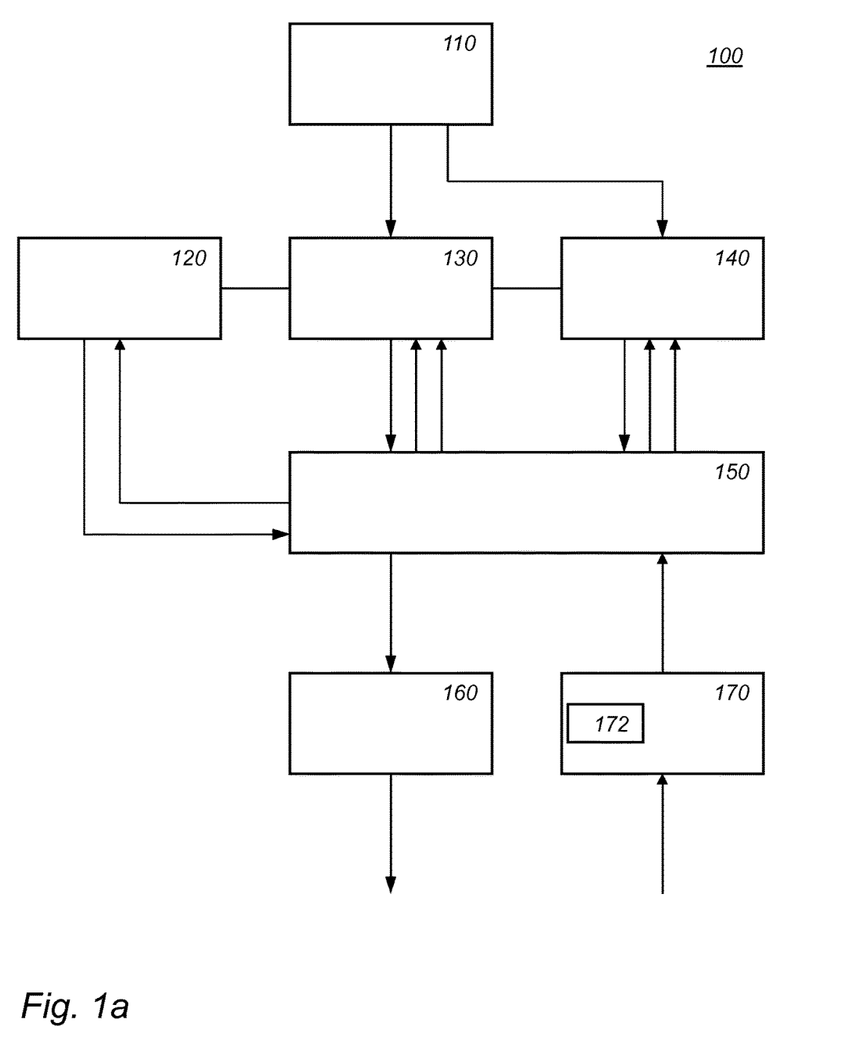

FIG. 1 schematically shows an example of an embodiment of a calculating device 100. Calculating device 100 is an electronic device for performing obfuscated arithmetic in a finite commutative ring. Many examples of commutative rings are known. Below examples are given for two such rings: the integers modulo a number ($\mathbb{Z}_n$) and the polynomials modulo a number and a polynomial ($\mathbb{Z}_n[x]/f(x)$). Other embodiment may use other commutative rings.

The elements of the ring are referred to as ring elements. On the ring elements an addition and a multiplication is defined, the latter are referred to as the ring-addition and the ring-multiplication.

Ring elements may be represented in any suitable form, should that be needed. For example, elements of $\mathbb{Z}_n$ may be represented as integers; elements of $\mathbb{Z}_n[x]/f(x)$ as polynomials. However, in calculation device 100, ring elements are represented as integer-lists. For example, a ring element a may be represented in calculation device 100 by a list ($a_1$, $a_2$). The latter even holds for non-integer rings, say polynomial rings. An integer-list encodes a ring-element according to some mapping between ring elements and integers lists; given any ring-element there is at least one integer list that represents the ring-element, and given any integer list, there is exactly one ring element that it represents. In embodiments any ring element may be represented as an integer list.

The integer-lists comprising at least two integers, and encode a ring element, such that the ring element equals a linear combination of powers of base ring element wherein the powers have exponents determined by the integer-list. For example, the integer-list ($a_1$, $a_2$) may encode the ring element a such that the ring element equals a linear combination of powers, e.g., $a = u^{a_1} - u^{a_2}$ using base ring element u. The base ring element has an order in the ring. The order of a base ring element u is defined as the smallest positive integer k such that $u^k = 1$ in the ring. Sometimes the order is denoted as order (u)=k.

The difference between the exponents is comprised in an allowed-differences list. If the exponents themselves are in the integer list then a first integer, e.g., $a_1$, of the integer-list and a second integer, e.g., $a_2$ of the integer list is comprised in an allowed-differences list. On the other hand this is not necessary. For example, the integer list ($a_1$, $a_2$) may also map to $a = u^{a_1+a_2} - u^{a_2}$, $a = u^{a_1} - u^{a_1+a_2}$, etc. In this case it is only required that one element of the integer list is comprised in the allowed differences list. Other mappings from the integer list to the exponents are possible.

The size of the allowed-differences list is less than the order of the base element. This means that the number of choices for an integer list is reduced. For example, given a single base ring element u with order k, the total number of different representations would be $k^2$. However when the difference is required to be in an allowed-differences list of size c, the total number of representations becomes kc which is less than $k^2$. We will use the letter A to denote the allowed-differences list.

The integer lists have at least two elements. As it turns out, the addition and multiplication operations require fewer steps if the integer list is shorter. Accordingly, in an embodiment the integer lists always have two elements. In the main description we will assume that the integer lists are integer pairs, however, examples of integer lists having more than two elements are provided.

As an example, the integer list $(a_1, a_2)$ may map to the ring element $(u^{a_1}-u^{a_2})$, wherein u is the special ring element, referred to as a base ring element. Furthermore, we will assume that as single base ring element u is used. Many variants are discussed below, including using multiple base elements. However in the main discussion we will assume as 'the example encoding' that a given integer list $(a_1, a_2)$ maps to the ring element $(u^{a_1}-u^{a_2})$, and that $a_1\ a_2 \in A$, wherein A represents the allowed-differences list; noting that there are other options.

The allowed-differences list A may be regarded as a subset of $\mathbb{Z}_k$. The difference allowed-differences list may be represented as a list, say an array, or positive integers. Verifying if a difference is in the list may require performing an modulo k operation. However, in practical implementation the use of the allowed-differences list will be implicit; encoding operations produce integer lists satisfying the condition, operations on the integer lists produce as output integer lists that satisfy the condition.

In an embodiment, the integers in an integers list are non-negative. This simplifies the computation, but is not necessary. Furthermore, in an embodiment, the integers in the integer list are taken modulo the order of a base element. The order of a base element u is the smallest integer k such that $u^k=1$. It is convenient to keep the values in an integer list in the range [0, k−1], e.g., by performing modulo k operations.

Calculation device 100 may comprise an operand store 150. Operands are stored as integer lists in operand store 150. Arithmetic may be performed on operands stored in operand store 150. Results of said arithmetic may be stored in operand store 150, where they may be used in new operations, or may be output to a different device, etc.

An integer lists, e.g., the operands in operand store 150 may be represented in several different ways. An integer list may be represented as a list of integers, say an array. For example, the arithmetical difference between a first integer of the integer-lists and a second integer of the integer list is comprised in the allowed-differences list. For example, taking the preferred case of integer lists having two elements, the integer list may be represented as the ordered list $(k_1, k_2)$, such that $k_1-k_2 \in A$. In this example, both parameters $k_1$ and $k_2$ may be chosen mod k, i.e., modulo the order of the base ring element. This is not strictly necessary, the parameters may be any integer, in this case, the requirement may be implemented, e.g., as $(k_1-k_2)$ mod $k \in A$.

As an another example, an increment list may be represented by choosing one of the integers in the integer list from the allowed-differences list. For example, this representation may take an integer-list $(k_1, k_2)$ wherein say $k_2$ is comprised in the allowed-differences list, the other integer or integers may be taken modulo the order k of the base ring element u. The allowed-differences list may be significantly smaller than the order, in this representation, fewer bits may be required to represent elements of A, thus reducing space requirements. In an embodiment, the integer in the integer list that is required to be a member of the allowed-differences list A is at a fixed position, say the first, or second position. But the latter is not necessary; the position may change as a further obfuscation measure.

Calculation device 100 comprises a storage 110 arranged to store an increment table T defined for an increment ring element. The increment table maps an input ring element to an output integer-list encoding an output ring element, such that the output ring element equals the increment ring element ring-added to the input ring element. In an embodiment, the input ring element is represented as an integer list. In this way, table T maps integer lists to integer lists; both according to the same encoding, e.g. the same mapping. However, there are embodiments in which the input ring element is represented as an integer list in an alternative encoding. In any case, the input ring element is represented in digital form, allowing the table to map the input ring element to an output ring element.

The output integer-list of the increment table satisfies the requirement that the output ring element which the output integer-list represents equals a linear combination of powers of the base ring element (u), wherein the powers have exponents determined by the output integer-list, a difference between a first exponent ($l_1$) and a second exponent ($l_2$) is comprised in an allowed-differences list (A). This will be referred to as the limited-differences requirement. In embodiments, the limited-differences requirements translates to a requirement on the integers in the integer list, e.g., that a function of the integers in the integer list is comprised in the allowed differences list.

The table may list input ring elements, in some format, together with the associated output integer list. The table may also be represented in storage by omitting the input ring and only listing the output integer lists. For example, this may be done if the input ring is represented in a canonical format.

For example, assuming the example encoding, the input ring element $k=u^{k_1}-u^{k_2}$ may be mapped by table T to an output integer-list. In this case, the input ring element may be represented as an integer list, so that we may have $(T(k_1, k_2))=(l_1, l_2)$. The latter encodes an output ring element $l=u^{l_1}-u^{l_2}$. The output ring element equals the increment ring element ring-added to the input ring element. For example, if the increment ring element is 1, then l=k+1. In an embodiment, the increment element may be 1, however this is not needed. For example, using the example encoding, the increment element may be chosen as $u^t$ for some value of t, e.g., any value 0<=t<order (u).

Not all possible combinations of input integer list need to be represented in the table, as many integer lists do not represent ring elements according to the limited differences requirement.

The increment table is much smaller than the tables described in the background. The latter tables take two inputs, e.g., two encoded numbers to produce an encoded output. However, the table T takes only one encoded input to produce one encoded output; the increment ring element is fixed. Assuming the encodings take a similar amount of space, the input space of T is reduced to about the square root. This is a significant size improvement.

With only the increment table, the calculation device can represent ring elements in an obfuscated fashion, and can add the increment elements to such an encoded ring element. This may be used, e.g., to implement a counter.

In an embodiment, calculation device 100 comprises a ring addition unit 130 and a ring multiplication unit 140. Calculation device 100 may also comprise a ring negation unit 120. In an embodiment, the ring multiplication unit 140 may use addition unit 130 to perform additions; addition unit 130 may use negating unit 120. This has been indicated in FIG. 1 by lines between unit 120, 130 and 140. However, units may be duplicated; for example, addition unit 130 may do its own negation, and multiplication 140 may do its own addition. Negation is also referred to as 'change of sign'.

Negation unit 120 may receive a negation-input integer list ($a_1$, $a_2$) encoding a negation-input ring element a. Negation unit 120 is arranged to determine an negation output integer list ($b_1$, $b_2$) encoding a negation-output ring element b. The negation output ring element is the negative of the negation input ring element, e.g., the negation output ring element equals the neutral ring element for the addition (0) minus the negation input ring element. Thus b=−a.

In an embodiment, the negation unit may compute the output integer list by permuting the negation input integer list. Using the example encoding, $a=u^{a_1}-u^{a_2}$, the output integer list may be ($a_2$, $a_1$). Negating by permutation may be efficiently implemented in code by changing the address from which an element is read, and it does not necessarily change the actual order in memory. This is possible if the allowed difference lists satisfies the requirement that a∈A implies −a∈A.

In an embodiment, the negation unit may compute the output integer list by adding a constant to each integer of the integer list. For example, in the example encoding using an integer m such that $u^m=-1$; for example the output integer list may be ($a_1$+m, $a_2$+m).

In an embodiment, the negation unit comprises a negation table. The negation table is configured to receive a negation-input integer-list (($a_1$, $a_2$)) encoding a negation-input ring element a and to produce a negation-output integer list (($b_1$, $b_2$)) encoding a negation-output ring element b, such that b=−a. The negation table is not very large as it is unary, moreover the negation table needs only to contain the negation-output integer list for input that satisfy the limited-differences requirement on the integer lists. The negation table is used in the same manner during addition and multiplication operations.

Figure 1B:
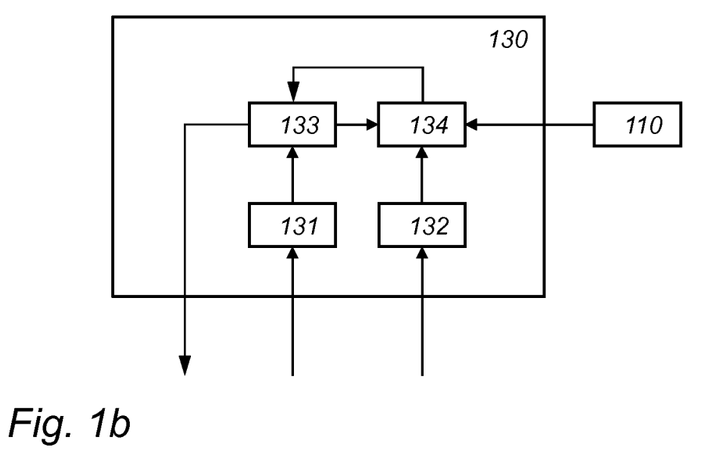

Ring addition unit 130 is arranged to receive a first addition-input integer-list ($a_1$, $a_2$) encoding a first addition-input ring element and a second addition-input integer list ($b_1$, $b_2$) encoding a second addition-input ring element. For example, ring addition unit 130 may receive the two operands from operand store 150. Ring addition unit 130 is arranged to determine an addition-output integer-list encoding an addition-output ring element by applying the increment table to ring elements determined from the first and second addition-input integer-lists, the addition-output ring element being equal to the ring-addition of the first addition-input ring element and the second addition-input ring element.

In an embodiment, the mapping of an integer list to a particular ring element comprises multiple sub-mapping, each sub-mapping being associated with an integer of the integer list, a sub-mapping mapping an integer to a ring element. The mapping is a linear combination, e.g., a sum, of the sub-mappings applied to the associated integers. A sub-mapping may be raising a base element to a power determined by the associated integer. For example, in the example encoding, ($a_1$, $a_2$) may be said to be a sum of the sub-mappings $u^{a_1}$ and $u^{a_2}$.

FIG. 1b illustrates an embodiment of addition unit 130. Addition unit 130 receives a first addition input integer list 131, and a second addition-input integer list 132. Addition unit 130 comprises an intermediate addition unit 134 arranged to iteratively add a ring element obtained from an integer of the second addition input integer list 132 to the first addition-input ring element. For example, the intermediate addition unit 134 may add to an intermediate sum 133 which is initialized to the first integer list element. The addition involves an application of the increment table from storage 110.

Figure 1C:
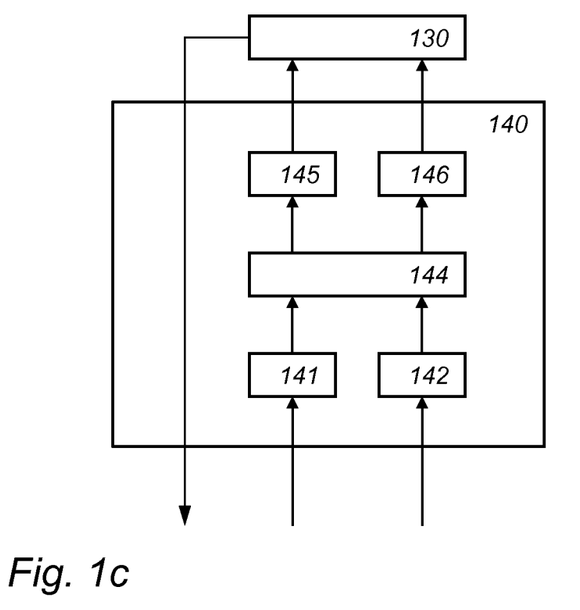

Ring multiplication unit 140 is arranged to receive a first multiplication-input integer-list ($r_1$, $r_2$) encoding a first multiplication-input ring element and a second multiplication-input integer list ($s_1$, $s_2$) encoding a second multiplication-input ring element. For example, multiplication unit 140 may receive two operands from operand store 150. Ring multiplication unit 140 is arranged to determine a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

FIG. 1c shows a possible embodiment of multiplication unit 140. Multiplication unit 140 receives a first multiplication-input integer-lists 141 and a second multiplication-input integer-lists 142. Multiplication unit 140 comprises an intermediate multiplication unit 144 arranged to determine from the first and second multiplication-input integer-lists 141, 142 a first intermediate multiplication integer-list 145 ($t_1$, $t_2$) and a second intermediate multiplication integer-list 146, ($u_1$, $u_2$), encoding a first and second intermediate multiplication ring element respectively. The multiplication unit 140 is arranged to add the first 145 and second intermediate multiplication integer-list 146 through the ring addition unit 130. Determining the intermediate integer list may involve arithmetic operations on the integers in the integer list, but does not require the increment table.

Calculation device 100 optionally comprise a ring encoding unit 170 for encoding a ring element of the commutative ring as an integer list, and a ring decoding unit 160 for decoding an integer-list (a, b) to a ring element (x) of the commutative ring. Encoding unit 170 and/or decoding unit 160 may be absent, e.g., when calculating device 100 receives encoded input and/or reports in encoded output. Encoding unit 170 and/or decoding unit 160 may be implemented as a standalone unit, e.g., as encoding device and/or decoding device 160.

The ring encoding unit 170 may comprise a storage 172 arranged to store an encoding table defined for a base ring element (u), the encoding table mapping the ring element (x) to an integer-list ((a, b)) such that the ring element equals a linear combination of powers of the base ring element ($x=u^a-u^b$), wherein the powers have exponents determined by the integer-list. Encoding unit 170 may store the encoded ring element in operator store 150. Encoding unit 170 allows the system to work with plain information.

The encoding table mapping the ring element (x) to an integer-list ((a, b)) such that the ring element equals a linear combination of powers of the base ring element ($x=u^a-u^b$), wherein the powers have exponents determined by the integer-list, a difference between a first exponent ($a_1$) and a second exponent ($a_2$) is comprised in an allowed-differences list (A), and wherein the size of the allowed-differences list is less than the order (k).

The ring decoding unit 160 is arranged to determine for one or more base ring element (u), the ring element (x) such that the ring element equals a linear combination of powers of one or more base ring element ($x=u^a-u^b$), wherein the powers have exponents determined by the integer-list. For example, decoding unit 160 may comprise a store storing a decoding table mapping integer lists to ring elements. For example, decoding unit 160 may comprise a computation unit to compute the powers and the linear combination thereof.

The decoding table need only map integer list that satisfy the limited-differences requirement, so that the decoding table has a smaller size than a decoding table that needs to maps all possible differences.

Many interesting embodiments omit one or both of the encoding and decoding units 160 and 170. For example, calculation device 100 may be configured to receive encoded information over a computer network, say the Internet. The proprietor of the system on which obfuscated calculation device 100 runs, e.g. a computer executing obfuscated calculation software may not know the encoding used for the input information, nor for information outputted by the system 100, e.g., transmitted back over the computer network. Accordingly, even though the calculations are performed in the cloud, the owner of the information has some assurance that his information is safe. Operating on information in encoded form is typically not possible using cryptography, say encryption. Even if a table system is used as outlined in the background this requires dual tables.

Typically, calculation device 100 comprises a microprocessor (not shown) which executes appropriate software stored at device 100; for example, that software may have been downloaded and/or stored in a corresponding memory, e.g., a volatile memory such as RAM or a non-volatile memory such as Flash (not shown). Alternatively, device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use.

In an embodiment, the electronic calculating device comprises a ring addition circuit and a ring multiplication circuit arranged to execute the function of the corresponding unit. The calculation device may also comprise a negation circuit. The circuit may be integrated circuits, such as CMOS, e.g. obtained by describing the functions in a hardware description language, such as Verilog and VHDL. The circuits may be a processor circuit and storage circuit, the processor circuit executing instructions represented electronically in the storage circuits. The circuits may also be FPGA, ASIC or the like.

The table store 110 and operand store 150 may be implemented as an electronic storage, e.g. a memory. Both stores may be part of the same memory, but they may be distinct memories. Table store 110 may be a non-volatile, non-writable, say a ROM, or Write once read many (WORM) memory. Operand store 150 may be a volatile or non-volatile writable memory, say Flash or RAM.

Figure 2:
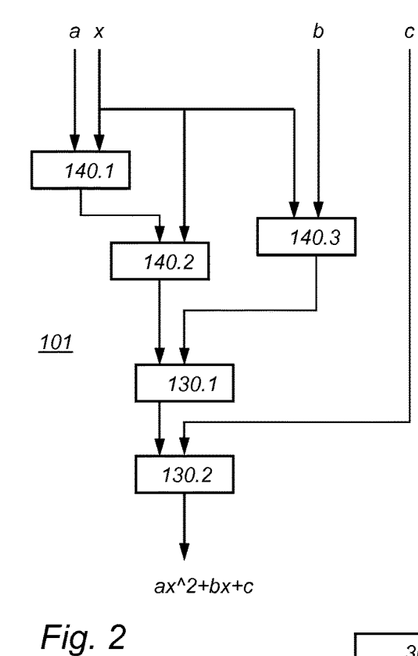

FIG. 2 schematically shows an example of an embodiment of a calculating device 101. Calculation device 101 is a refinement of calculation device 100. In an embodiment, calculation device 101 comprises multiple ring addition unit, multiple ring multiplication units, and optionally, multiple negating units. For example, FIG. 2 shows three multiplication unit, 1401.1, 140.2, and 140.3 and two addition unit 130.1 and 130.2. These units may be of the same design as units 140 and 130 respectively. The multiplication and addition units take relatively little space, e.g., when implemented in software these units need not be more than a few hundred low-level computer instructions. In particular, a copy of the addition and/or multiplication unit may be used for each multiplication or addition that is required in a computer program. This allows traditional obfuscation techniques. As an example, FIG. 2 shows how the polynomial $ax^2+bx+c$ may be computed using obfuscated arithmetic.

The operations of multiple arithmetic units, e.g., addition, multiplication, negation, may be order in any order allowed by their data dependencies. For example, operation 140.3 may be inserted in the ordering 140.1, 140.2, 130.1, and 130.2 at any point before 130.1. Moreover the ordering of subsequent multiplications or additions may be reversed. Thus a diagram like diagram 2 may be translated in a linear ordering for a software program in many ways. It is not needed that the units are strictly separated; instructions for a first unit may be interspersed with instructions for another unit.

Figure 3:
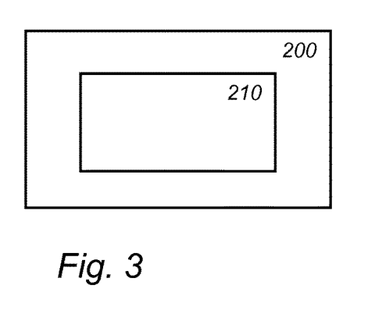

FIG. 3 schematically shows an example of an embodiment of a table computation device 200 for computing an increment table for use in a calculating device. The increment table may be used in a device like calculation device 100. The increment table may be stored on a non-transient storage device, e.g., a hard disk, a non-volatile memory chip etc. The table computation device 200 comprises a table creation unit 210 arranged to construct the increment table. For example, the table creation unit may be arranged to     repeatedly select an input ring element, e.g. x,     determine an output ring element that equals an increment ring element ring-added to the input ring element. For example, y=x+1 if the increment value is 1.

determine an output integer-list encoding for the output ring element.

For example, table computation device 200 may comprise an encoding unit like encoding unit 170.

add an entry to increment table mapping the input ring element to the output integer-list satisfying the limited-difference requirement.

These steps may be performed until all ring elements have been mapped to an integer list. In some embodiments, elements may be skipped, building a partial increment table; e.g., it may be known from the context that certain ring elements will not occur.

Given a ring R, a potential base ring element u, an encoding, say the example encoding, and an integer list length, say 2, a decoding table may be generated as given below. Let k be the order of u.

generate all integer lists satisfying the limited-difference requirement, e.g., by generating all integer lists of the integer list length, having integers mod k, and a first integer of the integer-list and a integer of the output integer-list being comprised in the allowed-differences list A.

For example, for an integer list of length two the following example algorithm may be used: for k1 from 0 to (k−1); for all d in A; generate (k1, k1+d mod k). For example, for a difference list A={0, 1, 4, 5, 902, 903, 906}, one may generate, generate: (0,0), (0,1), (0, 4), . . . , (1, 1), (1, 5), . . . etc. This example, differences list may be used with the ring $Z_{907}$, U=10, k=151.

for each generated integer list compute the ring element encoded by the integer list, and add an entry to the decoding table associating the integer list to the decoding. For example, continuing the above example, one may compute $151^1-151^5 \mod 907=76$. Thus the decoding table may receive the entry that (1,5) decodes to 76.

Although decoding may or may not use a decoding table such a table is also useful since an encoding table may be generated from a decoding table, e.g., by sorting the table for the ring elements. It may happen that a ring element has multiple encodings. For example the ring element 0 (neutral element for addition) may be represented as (a, a) in the example encoding for any a. Such multiple encodings may be removed from the table, e.g., by deleting all but 1 of the multiple entries for a given ring element; or by leaving the multiple entries in the table and using the encoding table to encode to a random one of the multiple entries.

Constructing a decoding or encoding table may also be used to find out if a ring element u is a base ring element. If constructing an encoding table fails, because it turns out that some ring elements do not have an encoding, then u is not a base ring element.

Below a number of embodiments of encodings, increment tables, ring addition methods and ring multiplication methods are presented. The negation, addition and multiplication units of calculation device 100 may be configured for any of these embodiments. All examples apply to any commutative ring, in particular $\mathbb{Z}_n$ and $\mathbb{Z}_n[x]/f(x)$. Herein is n a positive integer. Furthermore, it is greatly preferred that any element of the commutative ring may be represented in the chosen encoding. Not all commutative rings allow all elements to be represented in a given encoding, e.g., as a given type of integer list representation. Given a commutative ring R we will say that it allows full homogenous obfuscation if any element in R may be represented as an integer list using a given encoding type. The person skilled in the art can verify if a given commutative ring allows full homogenous obfuscation given an encoding, e.g., by generating all allowable encodings and verifying that together they represent all elements of a given ring. For some applications it may be allowed that the encoding has some gaps. This could have as a consequence that arithmetic cannot be performed on those gaps, at least not using the obfuscated integer list encoding. Specific examples of commutative rings allowing specific types of encodings are presented further below.

Below first a description is given of the example encoding in which the parameters are restricted to lie in the allowed-differences list. There are many types of encodings, which have in common that ring elements may be represented as lists of integers. These integers are not ring elements, e.g., even if the ring is not an integer ring say a polynomial ring, then nevertheless elements may be represented as integer lists. The encoding used, how a given integer list maps to a ring element is referred to as the encoding. Typically, the integer lists will always be of the same length, however this is not necessary. Generally, as the encoding allows more types of integer lists, e.g., longer lists, it becomes more likely that a given ring element may be encoded as an integer list in different ways. Given a commutative ring R, that has a base ring element u, such that any element a of R may be written as $u^{a_1}-u^{a_2}$, for some integers $a_1$ and $a_2$, such that $a_1-a_2 \in A$. Not all commutative rings may be encoded in this manner, but sufficiently many of them are for the encoding to be useful. The integers $a_1$ and $a_2$ are not themselves ring elements of ring R; they are integers operated upon modulo the order of the base element. Note that that the ring element a equals a linear combination of powers of the base element u, namely of $u^{a_1}$ and $u^{a_2}$; in this case the linear combination is obtained by multiplying the powers with +1 or −1 and summing them, more in particular, by subtracting a second power from a first power. The calculating device operates on ring elements encoded in the above fashion. The addition, negation and multiplication units can operate on ring elements in this encoding.

An increment table T plays a central role both in the addition and multiplication operation. The increment table maps an input ring element, in this case an input ring element may be represented as an integer list. For example, given an input integer list $(k_1, k_2)$ representing the input ring element $k=u^{k_1}-u^{k_2}$ the table T maps this to an output integer-list, e.g. $T((k_1, k_2))=(l_1, l_2)$ encoding an output ring element $l=u^{l_1}-u^{l_2}$. The output ring element equals the increment ring element ring-added to the input ring element. In this example, the increment element may be taken as 1, i.e., the ring element which is the identity for the ring multiplication; in this case $l=k+1$. It is convenient that the table may be applied directly to ring elements which use the same encoding, and thus which may be applied to ring elements having the integer list representation. Nevertheless, there are embodiments, in which the table is applied to ring elements in an alternative encoding. The alternative encoding may also be an integer list, but of an alternative type. Also the increment ring element need not be 1.

Below the operations, negation, addition, and multiplication are described.

Negation.

Given a negation-input integer-list $(a_1, a_2)$ representing the negation input ring element $a=u^{a_1}-u^{a_2}$, a negation-output integer-list may be obtained by permuting the integer list, in this case by reversing the order. The negation-output integer-list may be $(a_2, a_1)$. Negation by permutation requires that $A=-A$. Assuming that there exists an m, such that $u^m=-1$, which happens for many rings R, the negation may alternatively be obtained by adding a constant, e.g. m, to each integer of the integer list. In the latter case the negation-output integer-list may be $(a_1+m, a_2+m)$. This works since $a=u^{a_2}-u^{a_1}=u^{a_1+m}-u^{a_2+m}$. Arithmetic in the integer list is preferably done modulo the order of the base element. Here, an integer of the integer lists corresponds to an exponent of the base element, so integers that are the same module the order of the base element encode the same ring element. In any case, negation may be done by a negation table that maps a first integer list representing a first ring element to a second integer list representing minus the first ring element. When a table is used for negating there need not be any fixed relation between the parameters describing a ring element and the parameters describing minus the ring element.

Addition.

To add received first addition-input integer-list $(a_1, a_2)$ encoding a first addition-input ring element $a=u^{a_1}-u^{a_2}$ and a second addition-input integer list $(b_1, b_2)$ encoding a second addition-input ring element $b=u^{b_1}-u^{b_2}$ first an intermediate addition integer-list $((c_1, c_2))$ encoding an intermediate addition ring element c is determined.

The ring element c may be the first addition-input ring element a plus the base element u to a power determined from the second addition input integer list, in particular a first integer of the second addition input integer list. In this example, we may have $c=u^{a_1}-u^{a_2}+u^{b_1}$. To compute the latter we observe that $c=u^{a_1}-u^{a_2}+u^{b_1}=(u^{a_1-b_1}-u^{a_2-b_1}+1)u^{b_1}$. The term in brackets may be rewritten in the encoding using the increment table. Note that the integer list $(a_1-b_1, a_2-b_1)$ still satisfies the limited differences requirement if $(a_1, a_2)$ did.

Through a first application of the increment table to the ring element $u^{a_1-b_1}-u^{a_2-b_1}$ an element $u^{d_1}-u^{d_2}=u^{a_1-b_1}-u^{a_2-b_1}+1$ is obtained. For example, by $T((a_1-b_1, a_2-b_1))=(d_1, d_2)$. We then have that $c_1=d_1+b_1$ and $c_2=d_2+b_1$, thus determining the intermediate addition integer-list $((c_1, c_2))$ may further comprise adding an integer determined from the second addition-input integer-lists to the integers in the integer-list resulting from first application. Adding $u^{b_1}$ to a ring element in integer list representation, in this case, to a, is sometimes referred to as the positive reduction step.

Thus the addition unit has obtained intermediate addition ring element $c=u^{a_1}-u^{a_2}+u^{b_1}=u^{c_1}-u^{c_1}$, as the integer-list $(c_1,$ $c_2$). The intermediate addition ring element is thus a linear combination of powers of one or more base elements wherein the powers are determined from the first and second addition-input integer-lists. In this case the increment table is applied to the ring-element $u^{a_1-b_1}-u^{a_2-b_1}$ formed by the base ring element (u) raised to the power of a first integer of the first integer list ($a_1$) minus a first integer of the second integer list ($b_1$) minus the base ring element (u) raised to the power of a second integer of the first integer list ($a_2$) minus the first integer of the second integer list ($b_1$).

In this example, the addition-output integer-list may be determined through a second application of the increment table to ring elements determined from the intermediate addition integer-list and the second addition-input integer-list. This may comprise computing the sum of intermediate addition ring element c and minus the base element raised to a power determined from the second addition input integer list, e.g. the second integer of the second addition input integer list $b_2$: $c-u^{b_2}=u^{c_1}-u^{c_2}-u^{b_2}$. This may be accomplished by negating the intermediate addition ring-element represented by the intermediate addition integer-list before the second application of the increment table. The negating of c may be done as indicated above. As an example we use permuting, but the same operation may be performed by adding a constant to the exponent. After negating, the sum may use plus (instead of minus) the base element raised to a power determined from the second addition input integer list: $-c+u^{b_2}=u^{c_2}-u^{c_1}+u^{b_2}$. The latter operation is of the same type as above, and can be performed through a table application in the same manner as adding $u^{b_1}$. After this the result is negated again. The full addition may use two negations and two table applications, of the same increment table T.

Subtracting $-u^{b_2}$ from a ring element in integer list representation, in this case from c, is sometimes referred to as the negative reduction step. The negative reduction step may be performed by negating, performing the positive reduction step, and negating again. By indexing the increment table through a first parameter a and a difference d, say by representing the ring element $u^a-u^{a+d}$, a reduction in computation time is achieved. In this case the increment table may be indexed by T (a, d). Consider the positive reduction step for adding $u^b$. This may be done by $c=u^a-u^{a+d}+u^{b_1}=(u^{a-b}-u^{a-b+d}+1)u^b$, in this case the table is indexed as T (a−b, d). Thus only a single subtraction operation modulo k is needed.

Multiplication.

To multiply the received first multiplication-input integer-list ($r_1$, $r_2$) encoding a first multiplication-input ring element $r=u^{r_1}-u^{r_2}$ and a second multiplication-input integer list (($s_1$, $s_2$)) encoding a second multiplication-input ring element $s=u^{s_1}-u^{s_2}$, a first intermediate multiplication integer-list ($t_1$, $t_2$) and a second intermediate multiplication integer-list ($u_1$, $u_2$) are determined. A multiplication-output integer-list encoding a multiplication-output ring element is determined from the first and second intermediate element. In other embodiments, there may be more than two intermediate multiplication integer lists. We have that $r \cdot s=(u^{r_1}-u^{r_2})(u^{s_1}-u^{s_2})=u^{r_1+s_1}-u^{r_1+s_2}+u^{r_2+s_2}-u^{r_2+s_1}=(u^{r_1+s_1}-u^{r_1+s_2})+(u^{r_2+s_2}-u^{r_2+s_1})=t+u$. Partitioning the terms in the expanded products over two terms t and u may be done in different ways, e.g., as $(u^{r_1+s_1}-u^{r_2+s_1})+(u^{r_2+s_2}-u^{r_1+s_2})$.

Thus to multiply two ring elements represented as integer lists they may be transformed into two new integer lists that can be added to obtain the answer to the multiplication. The addition may be done as described above. For example, the multiplication unit may compute the intermediate integer lists and send them to the multiplication unit. For example, a first integer $t_1$ of the first intermediate multiplication integer-list may comprise a first integer $r_1$ of the first multiplication-input integer-list plus a first integer $s_1$ of the second multiplication-input integer-list, and a second integer $t_2$ of the first intermediate multiplication integer-list may comprise a first integer $r_1$ of the first multiplication-input integer-list plus a second integer $s_2$ of the second multiplication-input integer-list $t_1=r_1+s_1$, $t_2=r_1+s_2$; A first integer $u_1$ of the second intermediate multiplication integer-list may comprise a second integer $r_2$ of the first multiplication-input integer-list plus a second integer $s_2$ of the second multiplication-input integer-list, and a second integer $u_2$ of the second intermediate multiplication integer-list may comprise a second integer $r_2$ of the first multiplication-input integer-list plus a first integer $s_1$ of the second multiplication-input integer-list $u_1=r_2+s_2$, $u_2=r_2+s_1$, In an embodiment, e.g., in the example just disclosed, the arithmetic is performed on integer lists, the ring elements do not need to be calculated as ring elements in some natural representation. Now a number of the variants are discussed. Many of the variants are independent, e.g., a variant encoding may be combined with a variant to perform addition.

Through the obfuscated arithmetic when calculations are performed in the integer list, corresponding e.g. to $u^{a_1-b_1}$, etc, the value may be reduced modulo the order of u. For example, if the order of u is 30, all computations may be performed mod 30.

The Increment Value.

The increment value need not be 1. There are at least two ways to use a different increment value. First, the equation $c=u^{a_1}-u^{a_2}+u^{b_1}=(u^{a_1-b_1}-u^{a_2-b_1}+1)u^{b_1}$ may be modified to $c=u^{a_1}-u^{a_2}+u^{b_1}=(u^{a_1-b_1+t}-u^{a_2-b_1+t}+u^t)u^{b_1-t}$. This means that an increment table may be constructed that adds the value $u^t$. This increment table is applied to the same integer lists except an integer t is added. After the first application of the increment table the number $b_1-t$ is added instead of $b_1$. Another way to change increment value, is to take two elements g and p of R so that repeated addition of g in the ring gives p. For example, there is an integer h such that $h \cdot g=g+\ldots+g=p$. Assume there is an increment table $T_p$ with increment value p, for example, p=1 or $p=u^t$. An increment table $T_g$ may be constructed for g as increment value. The table $T_g$ may be applied h times to obtain the same effect as applying $T_p$ directly. Using different increment tables with different increment values may even be combined in a single embodiment, e.g., to increase obfuscation. The latter construction has the advantage that multiple increment values may be combined without changing the following addition computation.

The principles illustrated for the example encoding may be applied to number of alternative encodings. A first alternative encoding is to encode a ring element a as integer list ($a_1$, $a_2$) using the encoding $a=u^{a_1}+u^{a_2}$, still requiring that $a_1-a_2 \in A$. A ring which has a base ring element u such that any ring element may be encoded in this manner, is said to allow positive obfuscated arithmetic. The example encoding will be referred to as negative obfuscated arithmetic. It may be proven mathematically that for any ring that allows positive obfuscated arithmetic with base ring element u there exists an integer m such that $u^m=-1$. Furthermore, a ring that allows negative obfuscated arithmetic allows positive obfuscated arithmetic if and only if such a value m exists. Any ring that allows positive obfuscated arithmetic also allows negative obfuscated arithmetic, though the reverse is not true. Positive obfuscated arithmetic follows largely the same lines as for negative obfuscated arithmetic, outlined above.

Briefly, change of sign of an integer list may be done by adding the value m to all integers in the integer list. Given addition inputs $a=u^{a_1}+u^{a_2}$ and $b=u^{b_1}+u^{b_2}$, the addition may be performed by computing intermediary $c=u^{a_1}+u^{a_2}+u^{b_1}$, e.g. through $(u^{a_1-b_1}+u^{a_2-b_1}+1)u^{b_1}$. The increment table applies to $u^{a_1-b_1}+u^{a_2-b_1}$, with increment value 1; Assuming that the integer list $(a_1, a_2)$ satisfies the requirement, so does this latter number.

Positive reduction may be applied twice, both for $u^{b_1}$ and $u^{b_2}$, no negative reduction being necessary. This simplifies addition. The construction of the increment table may be varied as indicated above, by factoring a different power of u. The increment value may be varied as indicated above. Positive obfuscated arithmetic has the advantage that the increment table is always symmetric, and may be stored in compressed form. A disadvantage of positive obfuscation, is that fewer ring allows this type of encoding.

The encodings given so far may be optionally multiplied by a constant ring element $w=u^v$ for some v. Thus an integer list $(a_1, a_2)$ may represent the ring element $a=w(u^{a_1}-u^{a_2})$. The negation step is unchanged. The positive reduction step becomes $c=wu^{a_1}-wu^{a_2}+wu^{b_1}=(wu^{a_1-b}-wu^{a_2-b}+w)u^{b_1}$. The increment table may use as increment value w, and is applied to $wu^{a_1-b_1}-wu^{a_2-b_1}$, which has the same encoding type. Negative reduction step may be derived from the positive reduction step as indicated above. The multiplication may multiply $r=wu^{r_1}-wu^{r_2}$ and $s=wu^{s_1}-wu^{s_2}$, represented as integer-lists $(r_1, r_2)$ and integer lists $(s_1, s_2)$ using $r \cdot s=(wu^{r_1}-wu^{r_2})(wu^{s_1}-wu^{s_2})=(wu^{r_1+s_1+v}-wu^{r_1+s_2+v})+(wu^{r_2+s_2+v}-wu^{r_2+s_1+v})=t+u$.

The Number of Integers in an Integer List.

In the example discussed so far the number of elements in the integer list was always two. This number has advantages, i.e., it reduces the number of computation steps. On the other hand allowing more elements in the integer list extends the number of rings that allow the obfuscation. The example, below considers three integers per list, but more is possible and works analogously.

Consider the first integer list $(a_1, a_2, a_3)$ and second integer list $(b_1, b_2, b_3)$ encoding the elements $u^{a_1}+u^{a_2}+u^{a_3}$ and $u^{b_1}+u^{b_2}+u^{b_3}$ respectively. Negating may be done by adding a constant m to integers in the list. Addition may be done by applications of the increment table for each integer in the second integer list, in this case three times. The first intermediate addition integer list may be computed from $u^{a_1}+u^{a_2}+u^{a_3}+u^{b_3}=(u^{a_1-b_3}+u^{a_2-b_3}+u^{a_3-b_3}+1)u^{b_3}$. In this case the increment value is 1 and the increment table applies to $u^{a_1-b_3}+u^{a_2-b_3}+u^{a_3-b_3}$. To multiply, the same number of intermediate multiplication integer lists are made as in the second integer list, e.g.: $(a_1+b_1, a_2+b_1, a_3+b_1)$, $(a_1+b_2, a_2+b_2, a_3+b_2)$, $(a_1+b_3, a_2+b_3, a_3+b_3)$.

If the integer list $(a_1, a_2, a_3)$ satisfies that two particular numbers of the list have a difference in the allowed differences list, e.g., $a_1-a_2 \in A_1$ then so does $(u^{a_1-b_3}+u^{a_2-b_3}+u^{a_3-b_3})$, since $(a_1-b_3)-(a_2-b_3)=a_1-a_2$. For an integer list of length larger than two, one may also impose additional restriction, e.g., that a further first integer of the integer-list and a further second integer of the integer-list is comprised in a further allowed-differences list, e.g., the additional restriction that $a_2-a_3 \in A_2$. One may have that $A_1=A_2$.

Below examples for rings allowing negative and/or positive obfuscation are given, and how to find allowed-differences list. The ring R may be integer ring $\mathbb{Z}_n$, for a modulus n. The ring R may also be a polynomial ring $\mathbb{Z}_n[x]$ if (x) for some modulus n and reducing polynomial f(x).

Let R be a ring with obfuscatable arithmetic and base u, and let k=order (u). Two elements $r_1$ and $r_2$ both in $\mathbb{Z}_k$ will be called equivalent if there exists $t \in \mathbb{Z}_k$ such that $(u^{r_1}-1)u^t=u^{r_2}-1$. Note that this condition implies that $u^{r_1}-u^t=u^{r_2}-u^0$. Informally, one may say that two integers are equivalent under this condition if adding one of them to the allowed-difference list gives the same effect as adding the other. For example, take $R=\mathbb{Z}_{151}$, the base element u=2, having order k=15. The elements 2 and 8 are equivalent since $(2^2-1)2^{11}=2^8-1$. Likewise, the elements 4 and 10 are equivalent since $(2^4-1)2^{13}=2^{10}-1$.

One may proof mathematically that if R is a ring such that $u^m=-1$, then r and −r are always equivalent.

This equivalence relation induces equivalence classes on $\mathbb{Z}_k$, e.g., sets in which all elements are equivalent to each other. An allowed-differences list can now be determined by selecting the same number of elements of each equivalence class except from the equivalence class comprising 0. The element 0 will also be included in the allowed differences set, if it is needed to represent the ring element 0. This method for configuring an electronic calculating device (100) for performing obfuscated arithmetic in a commutative ring, may be executed by electronic configuration device, e.g., comprising a microprocessor and software for executing the software.

We provide the following examples:

Let $R=F_{2^8}$, the field with 256 elements generated as $\mathbb{Z}_2[x]/f(x)$, wherein $f(x)=x^8+x^4+x^3+x+1$, and with the base ring element $u=x^5+x^4+x+1$, having order 51 and which is a base for obfuscated arithmetic in the field R. Note that since R has characteristic 2, positive and negative obfuscation are the same. The equivalence classes are:

[0]
[1; 3; 11; 16; 21; 23; 28; 30; 35; 40; 48; 50]
[2; 5; 6; 9; 19; 22; 29; 32; 42; 45; 46; 49]
[4; 7; 10; 12; 13; 18; 33; 38; 39; 41; 44; 47]
[8; 14; 15; 20; 24; 25; 26; 27; 31; 36; 37; 43]
[17; 34]

An allowed differences set may be obtained by selecting at least one element from each class, e.g., A={0, 1, 2, 4, 8, 17}.

Let $R=F_{2^{12}}$, the field with $2^{12}$ elements generated as $\mathbb{Z}_2[x]$ if (x), wherein $f(x)=x^{12}+x^7+x^6+x^5+x^3+x+1$, and with the base ring element $u=x^{11}+x^{10}+x^7+x^5+x^3+x^2+x+1$, having order 195 and which is a base for obfuscated arithmetic in the field R. The equivalence classes are:

[0]
[13; 26; 39; 52; 65; 78; 91; 104; 117; 130; 143; 156; 169; 182]
[1; 8; 64; 73; 84; 87; 108; 111; 122; 131; 187; 194]
[2; 16; 21; 27; 49; 67; 128; 146; 168; 174; 179; 193]
[4; 32; 42; 54; 61; 97; 98; 134; 141; 153; 163; 191]
[3; 47; 72; 83; 112; 123; 148; 192]
[6; 29; 51; 94; 101; 144; 166; 189]
[7; 12; 58; 93; 102; 137; 183; 188]
[9; 14; 24; 79; 116; 171; 181; 186]
[18; 28; 37; 48; 147; 158; 167; 177]
[36; 56; 74; 96; 99; 121; 139; 159]
[5; 25; 40; 70; 125; 155; 170; 190]
[10; 50; 55; 80; 115; 140; 145; 185]
[20; 35; 85; 95; 100; 110; 160; 175]
[11; 69; 76; 90; 105; 119; 126; 184]
[15; 22; 43; 57; 138; 152; 173; 180]

[30; 44; 81; 86; 109; 114; 151; 165]
[23; 33; 60; 88; 107; 135; 162; 172]
[19; 46; 66; 75; 120; 129; 149; 176]
[38; 45; 63; 92; 103; 132; 150; 157]
[17; 53; 62; 68; 77; 82; 113; 118; 127; 133; 142; 178]
[31; 34; 41; 59; 71; 89; 106; 124; 136; 154; 161; 164]

Again an allowed differences set may be obtained by selecting at least one element from each equivalence class. The selection may be random.

Let $R = \mathbb{Z}_{907}$, with the base ring element u=10 having order 151 and which is a base for obfuscated arithmetic in the field R. The seven equivalence classes are:

[0]
±[1; 3; 8; 16; 18; 30; 31; 32; 33; 43; 53; 56; 62; 75; 78; 79; 101; 102; 113; 116; 124; 126; 128; 140; 149]
±[4; 9; 12; 15; 28; 44; 45; 47; 55; 57; 66; 67; 69; 71; 81; 83; 92; 99; 112; 114; 115; 127; 137; 138]
±[5; 6; 7; 21; 26; 29; 34; 40; 41; 51; 54; 61; 63; 64; 74; 86; 91; 93; 103; 105; 109; 129; 131; 132; 134; 141]

Note that the equivalency classes have a symmetry, which is used to denote the classes in shortened form.

Let $R = \mathbb{Z}_{1255}$, with the base ring element u=2 having order 100. Note that this ring is not a field. The 17 equivalence classes are:

[0]
±[1; 23; 25; 27; 42; 49; 94]
±[2; 34; 54; 55; 57; 67; 74; 83; 93; 95]
±[3; 11; 39; 47; 82; 90]
[4; 16; 24; 48; 52; 76; 84; 96]
[8; 44; 56; 92]
+[9; 19; 31; 38; 41; 70; 78]
[12; 20; 28; 72; 80; 88]
±[13; 14; 21; 29; 37; 65; 85]
[32; 40; 60; 68]
[36; 64]
[50]

One can proof that in a field, given an r we have that $(u^r - 1)u^s$ is different for all values of $s \in \mathbb{Z}_k$. Therefore each class can represent exactly k elements. We have therefore the formula k(c−1)=n−1 for fields. Numerical experiments show that for commutative rings that are not fields the ratio k(c−1)/(n−1) is close to 1, especially as n grows.

This also implies that given a field, and an allowed differences list which was obtained by selecting exactly one element from each equivalence class, and integer lists of length 2, gives a unique representation of each field element. By selecting more elements from each equivalence class, ring elements obtain multiple representations.

Below a number of examples are summarized and additional examples are given. For polynomial rings the details of base ring element and generator are given above. Note that φ(1255)=1000 (Euler's totient function), which is why the ring given $\mathbb{Z}_{1255}$ has only 1000 elements.

As can also be seen from the table above, rings with various sizes of allowed differences list may be obtained by generating rings with obfuscating arithmetic and computing the equivalence classes.

Having a smaller allowed differences lists has the advantage that this reduces the size of the increment table. In an embodiment, the increment table does not map an input ring element represented by the input integer list as a linear combination of powers ($k = u^{k_1} - u^{k_2}$) of a base ring element (u), if the powers do not have exponents that satisfy the limited differences requirement, e.g., determined by the integer-list for which the difference in the allowed-differences list (A), and wherein the size of the allowed-differences list is less than the order (k).

By searching more rings, the size of the allowed-differences list may be chosen small with respect to the to order k. An allowed-differences list may be reduced in size by selecting only one element of each equivalence class; an allowed-differences list may be extended in size by selecting more than one element of each equivalence class. It is preferred, if the size of the allowed-differences list is less than 50% the order, more preferably less than 20% the order, even more preferably, less than 10% the order, even more preferably less than 5% the order. In case, of unique representation in fields, it is desired that c/k is less than 0.5, 0.2, 0.1 and 0.05.

By choosing only one element of each equivalence class it is obtained that $$\left(\frac{k*(c-1)}{N-1} = 1\right),$$

this provides a larger reduction for the table. (Here c represents the number of elements in the allowed differences list.) For rings that are not fields, the bound may be somewhat larger than 1, say less than 2. In the latter case, the representation is sometimes unique but not always. On the other hand, it may be desirable to have multiple different representations for ring elements. This may be achieved by growing the allowed differences list so that $$\left(\frac{k*(c-1)}{N-1} > 2\right).$$

Figure 4:
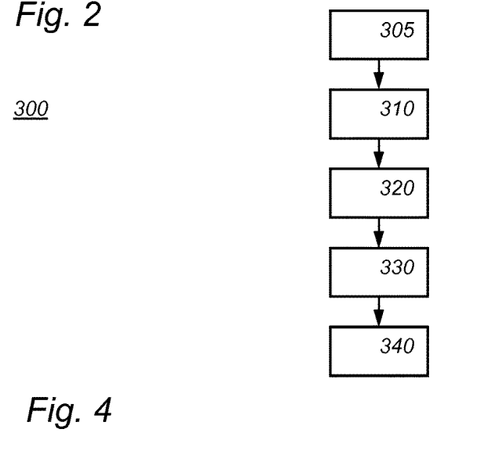

FIG. 4 schematically shows an example of an embodiment of a calculating method 300 for performing obfuscated arithmetic in a commutative ring ($\mathbb{Z}_n$; $\mathbb{Z}_n[x]/f(x)$), the ring having a finite number of ring elements, a ring-addition and a ring-multiplication being defined on the ring elements, the calculating method operating on integer-lists (($a_1$, $a_2$))

| Ring R | Size = n | Base ring element u | Order(u) = k | Number of equivalence classes = c | c/k * 100 | k(c − 1)/(n − 1) |
|---|---|---|---|---|---|---|
| F2^8 | 256 | | 51 | 6 | 11,76471 | 1 |
| F2^12 | 4096 | | 195 | 22 | 11,28205 | 1 |
| Z907 | 907 | 10 | 151 | 7 | 4,635762 | 1 |
| Z1511 | 1511 | 3 | 151 | 11 | 7,284768 | 1 |
| Z2417 | 2417 | 15 | 151 | 17 | 11,25828 | 1 |
| Z2719 | 2719 | 23 | 151 | 19 | 12,58278 | 1 |
| Z3323 | 3323 | 30 | 151 | 23 | 15,23179 | 1 |
| Z4229 | 4229 | 20 | 151 | 29 | 19,2053 | 1 |
| Z1255 | 1000 | 2 | 100 | 17 | 17 | 1,601602 | encoding ring elements ($u^{a_1}-u^{a_2}$), the integer-lists comprising at least two integers wherein an integer-list (($a_1, a_2$)) encodes a ring element (a) such that the ring element equals a linear combination of powers ($a=u^{a_1}-u^{a_2}$; $a=u^{a_1+a_2}-u^{a_2}$; $a=u^{a_1}+u^{a_2}$) of a base ring element (u), the base ring element having an order (k) in the ring, wherein the powers have exponents determined by the integer-list, a difference between a first exponent ($a_1$) and a second exponent ($a_2$) is comprised in an allowed-differences list (A), and wherein the size of the allowed-differences list is less than the order (k). The calculating method comprises storing 305 an increment table (T) defined for an increment ring element (1; $u^r$), the increment table mapping an input ring element ($k=u^{k_1}-u^{k_2}$) to an output integer-list ($T((k_1, k_2))=(l_1, l_2)$) encoding an output ring element ($l=u^{k_1}-u^{k_2}$), such that the output ring element equals the increment ring element ring-added to the input ring element (l=k+1), the output ring element equals a linear combination of powers of the base ring element (u), wherein the powers have exponents determined by the output integer-list, a difference between a first exponent ($l_1$) and a second exponent ($l_2$) is comprised in an allowed-differences list (A), and wherein the size of the allowed-differences list is less than the order (k).

The method may further comprise ring adding:
receiving 310 a first addition-input integer-list (($a_1, a_2$)) encoding a first addition-input ring element and a second addition-input integer list (($b_1, b_2$)) encoding a second addition-input ring element, determining 320 an addition-output integer-list encoding an addition-output ring element by applying the increment table to ring elements determined from the first and second addition-input integer-lists, the addition-output ring element being equal to the ring-addition of the first addition-input ring element and the second addition-input ring element.

The method may further comprise ring multiplication:
receiving 330 a first multiplication-input integer-list (($r_1, r_2$)) encoding a first multiplication-input ring element and a second multiplication-input integer list (($s_1, s_2$)) encoding a second multiplication-input ring element, determining 340 a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

Figure 5:
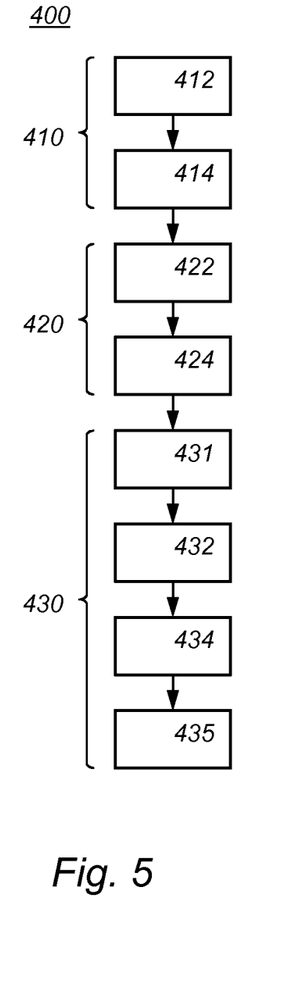

FIG. 5 schematically shows an example of an embodiment of an addition method 400, which may be used in device 100, or in method 300 etc. This example uses the example encoding. The method may be adapted to other encodings. All the variants described herein may be applied; this example uses increment value 1 and the increment table is constructed by factoring out $u^{b_1}$.

Method 400 comprises receiving addition operands 410. This may comprise receiving 410 a first addition input integer list, e.g., ($a_1, a_2$) and receiving 420 a second addition input integer list, e.g., ($b_1, b_2$).

The addition input integer lists each encode a ring element such that the ring element equals a linear combination of powers of a base ring element, the base ring element having an order in the ring, wherein the powers have exponents determined by the integer-list. The exponents satisfy the requirement that a difference between a first exponent and a second exponent is comprised in an allowed-differences list.

Method 400 further comprises determining 420 an intermediate addition integer-list, e.g. ($c_1, c_2$). For example, this may comprise applying the increment table to a ring element determined from the first and second addition-input integer-lists. In particular, the increment table may be applied to an integer list, the elements in the integer being derived from the elements in the input integer lists. The output of the table satisfies the requirement. For example, determining 420 may comprise applying 422 the increment table to ($a_1-b_1, a_2-b_1$), e.g. obtaining ($d_1, d_2$); and adding 424 the integer $b_1$ determined from second addition-input integer-lists to the integers in the integer-list resulting from first application, e.g., ($c_1, c_2$) ($d_1+b_1, d_2+b_1$).

Method 400 further comprises determining 430 the addition-output integer-list through a second application of the increment table to a ring element determined from the intermediate addition integer-list and the second addition-input integer-list. For longer integer lists this may involve additional increment table applications. For example, this may comprise negating 431 the intermediate addition integer-list, e.g., permuting to ($c_2, c_1$). Applying the 432 the increment table, and adding 434 are the same as applying 422 and adding 424 except that the addition input integer lists ($a_1, a_2$) is replaced by the intermediate integer list ($c_2, c_1$) and $b_1$ by $b_2$. Finally the result of 434 is negated 453 to obtain the result of the obfuscated addition.

If instead of negative obfuscation, as here, positive obfuscation is used, then negating 431, 435 may be omitted.

Figure 6:
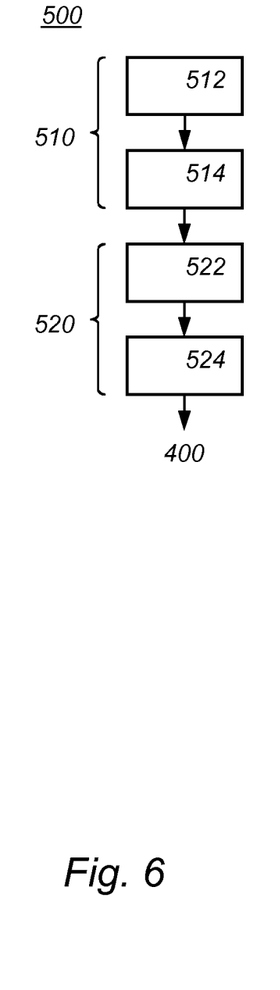

FIG. 6 schematically shows an example of an embodiment of a multiplication method 500, which may be used in device 100, or in method 300 etc. This example uses the same encodings and increment tables as method 400. As for the addition the inputs and output of the multiplication satisfy the requirement.

Method 500 comprises receiving multiplication operands 510. This may comprise receiving 510 a first multiplication-input integer-list, e.g. ($r_1, r_2$), and receiving 514 a second multiplication-input integer list ($s_1, s_2$).

Method 500 further comprises determining 520 a first and second intermediate multiplication integer-list. For example, 520 may comprise determining 522 a first intermediate multiplication integer-list and determining 524 a second intermediate multiplication integer-list. These may for example, be chosen as ($s_1+r_1, s_1+r_2$) and ($s_2+r_2, s_2+r_1$), respectively, although there are other choices. The multiplication continues by adding these numbers in the addition method 400.

Note that the table is only used in applying 422 and applying 432 and nowhere else in methods 400 and 500. Both addition and multiplication use the same table, and both use the table the same number of times (2). The other operations comprise small arithmetic operations on the integers in the integer list, e.g., modulo the order of the base ring element Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to an embodiment may be executed using software, which comprises instructions for causing a processor system to perform any one of methods 300, 400 and 500. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method may be executed using a bitstream arranged to configure programmable logic, e.g., a field-programmable gate array (FPGA), to perform the method.

It will be appreciated that an embodiment also extends to computer programs, particularly computer programs on or in a carrier, adapted for putting an embodiment into practice. The program may be in the form of source code, object code, a code intermediate source and object code such as partially compiled form, or in any other form suitable for use in the implementation of the method according to an embodiment. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
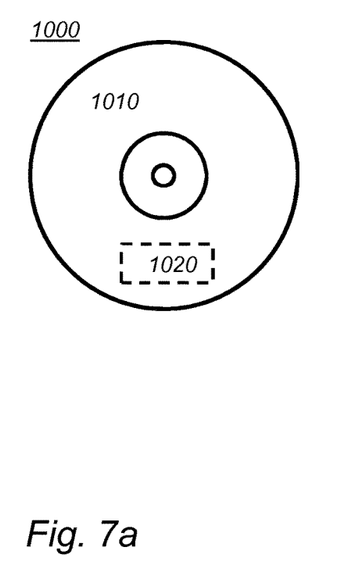
FIG. 7a shows a computer readable medium having a writable part comprising a computer program according to an embodiment.

FIG. 7a shows a computer readable medium 1000 having a writable part 1010 comprising a computer program 1020, the computer program 1020 comprising instructions for causing a processor system to perform a calculating method for performing obfuscated arithmetic according to an embodiment. The writable part may be arranged for multiple writing, or for writing once only. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said calculating method for performing obfuscated arithmetic.

A computer readable medium, e.g., computer readable medium 1000, may comprise an increment table, and/or a decoding table, and/or an encoding table.

Figure 7B:
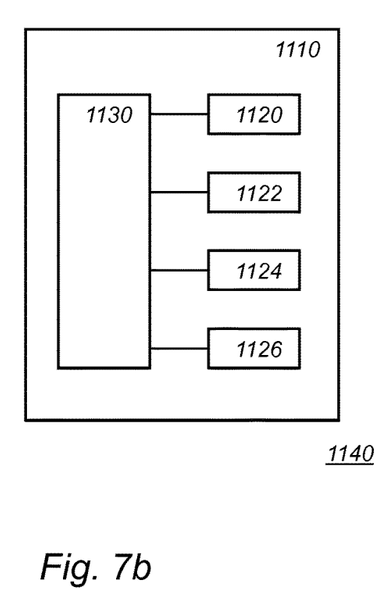
FIG. 7b shows a schematic representation of a processor system according to an embodiment.

FIG. 7b shows a schematic representation of a processor system 1100 according to an embodiment. The processor system comprises one or more integrated circuits 1110. The architecture of the one or more integrated circuits 1110 is schematically shown in FIG. 7b. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references are not exhaustive and shall not be construed as limiting the claim.

The invention claimed is:

1. An electronic calculating device for performing obfuscated arithmetic in a commutative ring ($\mathbb{Z}_n$; $\mathbb{Z}_n[x]/f(x)$), the ring having a finite number of ring elements, a ring-addition and a ring-multiplication being defined on the ring elements, the calculating device operating on integer-lists (($a_1$, $a_2$)) encoding ring elements ($u^{a_1}-u^{a_2}$), the integer-lists comprising at least two integers, wherein an integer-list ($a_1$, $a_2$)) encodes a ring element (a) such that the ring element equals a linear combination of powers ($a=u^{a_1}-u^{a_2}$; $a=u^{a_1+a_2}-u^{a_2}$; $a=u^{a_1}+u^{a_2}$)) of a base ring element (u), the base ring element having an order (k) in the ring, wherein the powers have exponents determined by the integer-list, a difference between a first exponent ($a_1$) and a second exponent ($a_2$) is comprised in an allowed-differences list (A), and wherein the size of the allowed-differences list is less than the order (k), the calculating device comprising: a hardware processor;

a storage device arranged to store an increment table (T) defined for an increment ring element (1; $u^r$), the increment table mapping an integer list representing an input ring element ($k=u^{k_1}-u^{k_2}$) to an output integer-list ($T(k_1, k_2)=(l_1, l_2)$) encoding an output ring element ($l=u^{l_1}-u^{l_2}$), such that the output ring element equals the increment ring element ring-added to the input ring element ($l=k+1$), the output ring element equals a linear combination of powers of the base ring element (u), wherein the powers have exponents determined by the output integer-list, a difference between a first exponent ($l_1$) and a second exponent ($l_2$) is comprised in an allowed-differences list (A).

2. A calculating device as in claim 1, wherein the size of the allowed-differences list is less than 50% the order, more preferably less than 20% the order, even more preferably, less than 10% the order, even more preferably less than 5% the order.

3. A calculating device as in claim 1, wherein the base ring element has an order, and the order (k) times the size of the allowed-differences list minus one (c−1) divided by the size of the ring minus one (N−1) is less than 2, more preferably equals 1

$$\left(\frac{k*(c-1)}{N-1}=1\right).$$

4. A calculating device as in claim 1, wherein the base ring element has an order, and the order (k) times the size of the allowed-differences list minus one (c−1) divided by the size of the ring minus one (N−1) is more or equal than two $$\left(\frac{k*(c-1)}{N-1}>2\right).$$

5. A calculation device as in claim 1 wherein the increment table takes as input an input integer-lists ($k_1$, $k_2$)) representing the input ring element, wherein
the arithmetical difference between a first integer ($k_1$) of the input integer-lists (($k_1$, $k_2$)) and a second integer ($k_2$) of the integer list is comprised in the allowed-differences list, or
an integer ($k_1$; $k_2$) of the input integer-lists (($k_1$, $k_2$)) is comprised in the allowed-differences list.

6. A calculating device as in claim 1, comprising
a ring addition unit arranged to
receive a first addition-input integer-list (($a_1$, $a_2$)) encoding a first addition-input ring element and a second addition-input integer list (($b_1$, $b_2$)) encoding a second addition-input ring element,
determining an addition-output integer-list encoding an addition-output ring element by applying the increment table to ring elements determined from the first and second addition-input integer-lists, the addition-output ring element being equal to the ring-addition of the first addition-input ring element and the second addition-input ring element.

7. A calculation device as in as in claim 6, wherein determining the addition-output integer-list comprises
determining an intermediate addition integer-list (($c_1$, $c_2$)) encoding an intermediate addition ring element by a first application of the increment table to a ring element) ($u^{a_1-b_1}-u^{a_2-b_1}$) being a linear combination of powers of one or more base elements wherein the powers are determined from the first and second addition-input integer-lists, ($u^{c_1}-u^{c_2}=u^{a_1}-u^{a_2}+u^{-b_1}$),
determining the addition-output integer-list comprising a second application of the increment table to ring elements determined from the intermediate addition integer-list and determined from the second addition-input integer-list.

8. A calculating device as in claim 1, comprising
a ring multiplication unit arranged to
receive a first multiplication-input integer-list (($r_1$, $r_2$)) encoding a first multiplication-input ring element and a second multiplication-input integer list (($s_1$, $s_2$)) encoding a second multiplication-input ring element,
determining a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

9. A calculation device as in claim 1, wherein
the commutative ring is a ring formed by the integers modulo an integer modulus ($\mathbb{Z}_n$), and/or
the commutative ring is a ring formed by the integer polynomials modulo an integer polynomial modulus ($\mathbb{Z}_n[x]/f(x)$).

10. A ring encoding device for encoding a ring element of a commutative ring ($\mathbb{Z}_n$; $\mathbb{Z}_n[x]/f(x)$) as an integer list, for use with a calculation device as in claim 1, the ring encoding device comprising
a storage arranged to store an encoding table defined for a base ring element (u), the encoding table mapping the ring element (x) to an integer-list ((a, b)) such that the ring element equals a linear combination of powers of the base ring element ($x=u^a-u^b$), wherein the powers have exponents determined by the integer-list, a difference between a first exponent ($a_1$) and a second exponent ($a_2$) is comprised in an allowed-differences list (A), and wherein the size of the allowed-differences list is less than the order (k).

11. A ring decoding device for decoding an integer-list ((a, b)) to a ring element (x) of a commutative ring ($\mathbb{Z}_n$; $\mathbb{Z}_n[x]/f(x)$), for use with a calculation device as in claim 1, the ring decoding device being arranged to determine for one or more base ring element (u), the ring element (x) such that the ring element equals a linear combination of powers of one or more base ring element ($x=u^a-u^b$), wherein the powers have exponents determined by the integer-list, a difference between a first exponent ($a_1$) and a second exponent ($a_2$) is comprised in an allowed-differences list (A), and wherein the size of the allowed-differences list is less than the order (k).

12. A table computation device for computing an increment table for use in a calculating device for performing obfuscated arithmetic in a commutative ring ($\mathbb{Z}_n$; $\mathbb{Z}_n[x]/f(x)$)), the ring having a finite number of ring elements, a ring-addition and a ring-multiplication being defined on the ring elements, the calculating device operating on integer-lists (($a_1$, $a_2$)) encoding ring elements ($u^{a_1}-u^{a_2}$), the integer-lists comprising at least two integers, the table computation device comprising: a memory;
a table creation unit implemented using at least one hardware processor arranged to construct an increment table, the table creation unit being arranged to
repeatedly select an input ring element,
determine an output ring element that equals an increment ring element ring-added to the input ring element
determine an output integer-list encoding for the output ring element as a linear combination of powers ($a=u^{a_1}-u^{a_2}$; $a=u^{a_1+a_2}-u^{a_2}$; $a=u^{a_1}+u^{a_2}$) of a base ring element (u), the base ring element having an order (k) in the ring, wherein the powers have exponents determined by the output integer-list, a difference between a first exponent ($a_1$) and a second exponent ($a_2$) is comprised in an allowed-differences list (A), and wherein the size of the allowed-differences list is less than the order (k),
add an entry to increment table mapping the input ring element to the output integer-list.

13. An electronic configuration device for configuring an electronic calculating device (100) for performing obfuscated arithmetic in a commutative ring (($\mathbb{Z}_n$; $\mathbb{Z}_n[x]/f(x)$) as in claim 1, providing a ring having a finite number of ring elements,
providing a base ring element u having an order k,
defining an equivalence relation on $\mathbb{Z}_k$ such that two elements $r_1$ and $r_2$ are equivalent if and only if $(u^{r_1}-1)u^t = u^{r_2}-1$ in the ring for some element t of $\mathbb{Z}_k$, the equivalence relation inducing equivalence classes on $\mathbb{Z}_k$,
determining an allowed-differences list by selecting at least one element from each equivalence class.

14. An electronic calculating method for performing obfuscated arithmetic using at least one hardware processor in a commutative ring ($\mathbb{Z}_n$; $\mathbb{Z}_n[x]/f(x)$), the ring having a finite number of ring elements, a ring-addition and a ring-multiplication being defined on the ring elements, the calculating method operating on integer-lists $(a_1, a_2)$ encoding ring elements ($u^{a_1}-u^{a_2}$), the integer-lists comprising at least two integers wherein an integer-list $((a_1, a_2))$ encodes a ring element (a) such that the ring element equals a linear combination of powers ($a=u^{a_1}-u^{a_2}$; $a=u^{a_1+a_2}-u^{a_2}$; $a=u^{a_1}+u^{a_2}$) of a base ring element (u), the base ring element having an order (k) in the ring, wherein the powers have exponents determined by the integer-list, a difference between a first exponent ($a_1$) and a second exponent ($a_2$) is comprised in an allowed-differences list (A), and wherein the size of the allowed-differences list is less than the order (k), the calculating method comprising
storing an increment table in a storage device by the at least one hardware processor, (T) defined for an increment ring element (1; $u^r$), the increment table mapping an integer list representing an input ring element ($k=u^{k_1}-u^{k_2}$) to an output) integer-list ($T((k_1, k_2))=(l_1, l_2)$) encoding an output ring element ($l=u^{l_1}-u^{l_2}$), such that output ring element equals the increment ring element ring-added to the input ring element (l=k+1), the output ring element equals a linear combination of powers of the base ring element (u), wherein the powers have exponents determined by the output integer-list, a difference between a first exponent ($l_1$) and a second exponent ($l_2$) is comprised in an allowed-differences list (A), and wherein the size of the allowed-differences list is less than the order (k).

15. An electronic calculating method as in claim 14, comprising
ring adding, the ring adding comprising
receiving a first addition-input integer-list $((a_1, a_2))$ encoding a first addition-input ring element and a second addition-input integer list $((b_1, b_2))$ encoding a second addition-input ring element,
determining an addition-output integer-list encoding an addition-output ring element by applying the increment table to ring elements determined from the first and second addition-input integer-lists, the addition-output ring element being equal to the ring-addition of the first addition-input ring element and the second addition-input ring element.

16. A computer program comprising computer program instructions stored in a non-transitory computer readable medium arranged to perform the method of claim 14 when the computer program is run on a programmable apparatus.

17. A non-transitory computer readable medium comprising
the computer program according to claim 16, and/or
an increment table for performing obfuscated arithmetic in a commutative ring ($\mathbb{Z}_n$; $\mathbb{Z}_n[x]/f(x)$), the ring having a finite number of ring elements, a ring-addition and a ring-multiplication being defined on the ring elements, integer-lists $((a_1, a_2))$ encoding ring elements ($u^{a_1}-u^{a_2}$), the integer-lists comprising at least two integers, wherein an integer-list $((a_1, a_2))$ encodes a ring element (a) such that the ring element equals a linear combination of powers ($a=u^{a_1}-u^{a_2}$; $a=u^{a_1+a_2}-u^{a_2}$; $a=u^{a_1}+u^{a_2}$) of a base ring element (u), the base ring element having an order (k) in the ring, wherein the powers have exponents determined by the integer-list, a difference between a first exponent ($a_1$) and a second exponent ($a_2$) is comprised in an allowed-differences list (A), and wherein the size of the allowed-differences list is less than the order (k),
the increment table (T) being defined for an increment ring element (1; $u^r$),
the increment table mapping an integer list representing an input ring element ($k=u^{k_1}-u^{k_2}$) to an output integer-list ($T((k_1, k_2))=(l_1, l_2)$) encoding an output ring element ($l=u^{l_1}-u^{l_2}$), such that the output ring element equals the increment ring element ring-added to the input ring element (l=k+1), the output ring element equals a linear combination of powers of the base ring element (u), wherein the powers have exponents determined by the output integer-list, a difference between a first exponent ($l_1$) and a second exponent ($l_2$) is comprised in an allowed-differences list (A).

* * * * *